(12) United States Patent
Fu et al.

(10) Patent No.: US 7,888,295 B2
(45) Date of Patent: Feb. 15, 2011

(54) CROSSLINKED POLYMER SOLUTIONS AND METHODS OF USE

(75) Inventors: Diankui Fu, Tyumen (RU); Andrey Federov, Tyumen (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 247 days.

(21) Appl. No.: 11/672,829

(22) Filed: Feb. 8, 2007

(65) Prior Publication Data

US 2008/0194431 A1 Aug. 14, 2008

(51) Int. Cl.
C09K 8/60 (2006.01)
C09K 8/68 (2006.01)
C09K 8/74 (2006.01)

(52) U.S. Cl. .................. 507/219; 507/273; 507/209; 507/269; 507/211

(58) Field of Classification Search .......... 507/211, 507/219, 273, 209, 269
See application file for complete search history.

(56) References Cited

U.S. PATENT DOCUMENTS

| | | | |
|---|---|---|---|
| 3,974,077 A * | 8/1976 | Free | ............................ 507/211 |
| 5,220,960 A | 6/1993 | Totten | |
| 5,252,234 A * | 10/1993 | Sharif | ......................... 507/241 |
| 5,281,270 A | 1/1994 | Totten | |
| 5,301,752 A | 4/1994 | Cowan | |
| 5,304,620 A | 4/1994 | Holtmyer | |
| 5,314,022 A | 5/1994 | Cowan | |
| 5,314,031 A | 5/1994 | Hale | |
| 5,325,922 A | 7/1994 | Cowan | |
| 5,337,824 A | 8/1994 | Cowan | |
| 5,343,947 A | 9/1994 | Cowan | |
| 5,343,952 A | 9/1994 | Cowan | |
| 5,358,044 A | 10/1994 | Hale | |
| 5,363,916 A | 11/1994 | Himes | |
| 5,379,840 A | 1/1995 | Cowan | |
| 5,379,843 A | 1/1995 | Unger | |
| 5,439,056 A | 8/1995 | Cowan | |
| 5,439,057 A | 8/1995 | Weaver | |
| 5,877,127 A * | 3/1999 | Card et al. | ................... 507/273 |
| 6,743,756 B2 * | 6/2004 | Harris, Jr. | .................... 507/261 |
| 6,910,537 B2 | 6/2005 | Brown | |
| 7,084,096 B2 * | 8/2006 | Harris et al. | ................. 507/273 |
| 7,237,610 B1 | 7/2007 | Saini | |
| 2003/0150614 A1 | 8/2003 | Brown | |
| 2004/0235675 A1 | 11/2004 | Qiu | |
| 2006/0081371 A1 | 4/2006 | Duenckel | |
| 2006/0116296 A1 | 6/2006 | Kippie | |
| 2006/0205605 A1 | 9/2006 | Dessinges | |

FOREIGN PATENT DOCUMENTS

| | | |
|---|---|---|
| RU | 2139424 | 10/1999 |
| RU | 2215016 | 10/2003 |
| WO | 2006095291 A1 | 9/2006 |

* cited by examiner

Primary Examiner—Timothy J. Kugel
Assistant Examiner—Atnaf Admasu
(74) Attorney, Agent, or Firm—Rachel Greene; David Cate; Robin Nava (57) ABSTRACT

A well treatment composition is formed from an aqueous crosslinkable hydrated polymer solution. Combined with the polymer solution is a solid boric acid or borate crosslinking agent and a solid metal oxide or metal hydroxide pH buffering agent that has limited solubility (less than 100 kg/m$^3$ at 20° C.) within the polymer solution that provides the solution with a pH of from about 8 to about 11. The composition may be introduced into a subterranean formation through a wellbore that penetrates the formation. The composition may provide at least one of shortened shear recovery time and an increase in the thermal stability of the aqueous polymer solution.

18 Claims, 7 Drawing Sheets

CROSSLINKED POLYMER SOLUTIONS AND METHODS OF USE

BACKGROUND

The invention relates to treatment fluids for subterranean formations penetrated by a wellbore, and more particularly, crosslinkable polymer based fracturing fluids which incorporate metal oxides to help control crosslinking.

The statements in this section merely provide background information related to the present disclosure and may not constitute prior art.

In the recovery of hydrocarbons from subterranean formations it is common practice, particularly in low permeability formations, to fracture the hydrocarbon-bearing formation (i.e. to create a fracture or create a less resistance path for the formation fluids) to enhance oil and gas recovery. In such fracturing operations, a fracturing fluid that is capable of suspending a proppant is hydraulically injected into a wellbore that penetrates a subterranean formation. The fracturing fluid is forced against the formation strata by applying sufficient pressure to the extent that the fracturing fluid opens a fracture in the formation. This pressure is then maintained while injecting fracturing fluid at a sufficient rate to further extend the fracture in the formation. As the formation strata or rock is forced to crack and fracture, a proppant is placed in the fracture by movement of a viscous fluid containing proppant into the crack in the rock. After the pressure is reduced, the fracture closes on the proppant, thus preventing complete closure of the fracture. The resulting fracture, with proppant in place, provides improved flow of the recoverable fluid, i.e., oil, gas, or water, into the wellbore.

Natural polymers such as guar and its derivatives have been widely used as gelling agents to prepare viscous fracturing fluids for hydraulic fracturing treatments. These polymers are water soluble or "hydratable" polymers. For such treatments, the polymer is combined with an aqueous fluid so that the polymer is hydrated to give a linear gel solution and then crosslinked to give a viscous gel solution. Crosslinking may occur instantly or be delayed until the fluid reaches the desired location.

The most common fluid system used today mainly consists of naturally occurring guar as a gelling agent and boric acid, which is activated by a highly soluble base such as sodium hydroxide (NaOH). The amount of NaOH used is dependent upon the formation temperature in order that the fluid maintains appropriate pH fluid for stability. For example, for formation temperature of 100° C., it is common to add NaOH to achieve an initial fluid pH of 11 to 12.

In crosslinked polymer solutions, higher temperatures typically result in a drop of the pH. When the pH is reduced too much, gelation of the solution can be reversed so that fluid viscosity is lost. A higher pH is therefore typically used to ensure stability under high temperature conditions. At a pH of 10-12, which is often used for such fluids, the crosslinked polymer system typically exhibits increased stability under high temperature conditions. Such high pH fluids, however, exhibit longer shear recoveries, which may last several minutes.

There is therefore a need to provide compositions and methods that provide improvements in these areas.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

The invention will now be more fully described in the more limited aspects of detailed embodiments thereof including a number of examples which should be considered only as illustrative of the concept of the invention. It will be understood that such description and examples do not in any way limit the scope of the invention described.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

In hydraulic fracturing of subterranean formations the fracturing fluids, which are typically aqueous fluids, may be viscosified so that they have sufficient viscosities to carry or suspend proppant materials, prevent fluid leak off, etc. In order to provide higher viscosity to the aqueous fracturing fluids water soluble or hydratable polymers are often added to the fluid. These hydratable polymers are crosslinked using crosslinking agents, such as metal ions, to provide a polymer network that increases the viscosity of the fluid to a desired fluid viscosity.

Fluids that carry proppants, particularly those used for carrying larger sized proppants of, for example, 12/18 mesh (1.68 mm/1 mm) or larger, must be provided with a viscosity that is maintained during the course of the treatment so that that proppants remain suspended when the proppant slurry enters the perforation or fracture. Temperatures commonly encountered downhole, however, may decrease the viscosity of the fracturing. Thus, fracturing fluids that maintain sufficient viscosity for the temperatures encountered for the duration of the treatment are particularly useful.

The temperatures encountered when the fluid enters the perforations are typically lower than the bottomhole static temperature. After the fluid enters the fracture it is beneficial for the fluid to also maintain high viscosity for the duration of the pumping time at the bottomhole static temperature in order to effectively keep the fracture open and for fracture propagation.

Fracturing fluid from the surface to the perforation normally experiences higher shear rates than those encountered within the fracture. It is beneficial that the shear-thinned fluid recovers its high viscosity as soon as possible after it passes through the perforations, especially during the stages of pumping proppant. Because at this stage the fluid is usually at near wellbore temperatures, which is typically much lower than bottomhole static temperatures, high shear recovery at near wellbore temperatures is desirable.

It has been observed, that fluids with low pH of around 8.5 to about 9.5 tend to have increased viscosity recovery at lower temperatures, which may be from about 30° C. to about 60° C. Low pH fracturing fluids, however, also tend to be unstable at higher temperatures of from about 85° C. or higher. This may be due, at least in part, to the additional decline in pH resulting from the higher temperatures. By maintaining the pH at both near wellbore temperatures and at temperatures encountered within the fracture, good shear recovery and thermal stability may be achieved for the duration of the treatment.

In the present invention, the hydrated polymers useful in the present invention may include any hydratable polymers familiar to those in the well service industry that are water soluble and capable of crosslinking with metal ions, such as polyvalent metal ions, that react with the polymers to form a composition with adequate and targeted viscosity properties for particular operations. Some examples of suitable hydratable polymers include, but are not necessarily limited to, galactomannan gums, glucomannan gums, guars, derived guars, cellulose, cellulose derivatives, and any other appropriate polymers. Nonlimiting examples include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful. Synthetic polymers such as, but not limited to, polyacrylamide and polyacrylate polymers and copolymers are used typically for high-temperature applications. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described published U.S. Pat. App. No. US 2004209780, Harris et. al.

In some preferred embodiments, the hydratable polymer is a guar polymer. In some others, the polymer is a substituted hydroxyalkyl galactomannan polymer. Examples of useful hydroxyalkyl galactomannan polymers include, but are not limited to, hydroxy-C1-C4-alkyl galactomannans, such as hydroxy-C1-C4-alkyl guars. Preferred examples of such hydroxyalkyl guars include hydroxyethyl guar (HE guar), hydroxypropyl guar (HP guar), and hydroxybutyl guar (HB guar), and mixed C2-C4, C2/C3, C3/C4, or C2/C4 hydroxyalkyl guars. Hydroxymethyl groups can also be present in any of these.

As used herein, substituted hydroxyalkyl galactomannan polymers are obtainable as substituted derivatives of the hydroxy-C1-C4-alkyl galactomannans, which include: 1) hydrophobically-modified hydroxyalkyl galactomannans, e.g., C1-C18-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be C1-C4 oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-C1-C4-alkyl guars, such descriptions apply equally to other galactomannans, as well.

When incorporated, the hydratable polymer may be present at any suitable concentration. In various embodiments hereof, the hydratable polymer can be present in an amount of from about 1 to less than about 60 pounds per thousand gallons of liquid (or about 0.01 wt % to less than about 0.72 wt % for conversion purposes), or from about 15 to less than about 40 pounds per thousand gallons, from about 15 to about 35 pounds per thousand gallons, 15 to about 25 pounds per thousand gallons, or even from about 17 to about 22 pounds per thousand gallons. Preferably, the hydratable polymer is present in an amount of from about 10 to less than or equal to about 50 pounds per thousand gallons of liquid phase, with a lower limit of polymer being no less than about 10, 11, 12, 13, 14, 15, 16, 17, 18, or 19 pounds per thousand gallons of the liquid portion, and the upper limited being less than about 50 pounds per thousand gallons, no greater than 59, 54, 49, 44, 39, 34, 30, 29, 28, 27, 26, 25, 24, 23, 22, 21, or 20 pounds per thousand gallons of liquid. In some embodiments, the polymers can be present in an amount of about 40 pounds per thousand gallons.

The present invention utilizes an initially solid boric acid and/or borate crosslinking agent that is used in combination with a solid metal oxide or metal hydroxide pH buffering agent that has limited solubility in water. These materials may be used in dry form or in a non-aqueous slurry. The materials may be mixed at the surface and then injected into the well to provide controlled delay in crosslinking to provide increased shear stability and shear recovery.

The solid borate crosslinking agent may include alkaline earth metal borates and alkali metal borates, and mixtures thereof. These borates may have limited solubility in the aqueous polymer solution at given temperatures. In particular, the borates may have a solubility in water of less than 10 kg/m$^3$ at 22° C. Additionally, the borates may have a solubility rate such that less than about 50% by weight of the boron in the borate is soluble in water within 15 minutes at 22° C. for the concentrations used in the polymer solutions. And solubilities may be increased only slightly at higher temperatures, such as temperatures greater than 85° C. The borates may be used in their hydrated form or they may be dehydrated. Non-limiting examples of suitable borate crosslinking agents may include those described in U.S. Pat. No. 4,619,776, which is herein incorporated by reference in its entirety.

The boric acid and/or borate crosslinking agent is typically used in an amount of 0.5 kg/m$^3$ to about 10 kg/m$^3$ of the composition, more particularly from about 1 kg/m$^3$ to about 5 kg/m$^3$. If used in a non-aqueous slurry, this range may be different.

The boric acid or borate crosslinking agent may be used in various particle sizes. Increased particle size slows dissolution of the solid crosslinking agent. In many applications, a particle size of 0.15 mm (~100 mesh) or less is suitable. In the present invention, particle sizes of 0.075 mm (~200 mesh), 0.038 mm (~400 mesh) or less may be used. Granulated particles may be used if they are to be added dry on the fly on location.

The solid metal oxide or metal hydroxide pH buffering agents facilitate controlling or buffering of the pH to achieve a desired pH value or range of values for the polymer solution. The solid buffering agent has limited solubility in the aqueous polymer solution. In particular, the solid metal oxide or metal hydroxide pH buffering agent may have a solubility in water at 20° C. of less than 100 kg/m$^3$, less than 50 kg/m$^3$, less than 10 kg/m$^3$ or less than 1 kg/m$^3$ or lower. The dissolution rate may be such that that pH buffering agent does not dissolve too fast during the first few minutes so that the pH remains low before the fluid enters the formation. The solid metal oxide or solid metal hydroxide may then dissolve more readily at higher temperatures, such as those at or near the bottomhole static temperature, to increase the pH.

Examples of suitable metal oxides and hydroxides for use in the present invention may include calcium hydroxide (Ca(OH)$_2$), calcium oxide (CaO), magnesium hydroxide (Mg(OH)$_2$), magnesium oxide (MgO), aluminum oxide (Al(OH)$_3$), aluminum oxide (Al$_2$O$_3$) and silicate oxides and hydroxides, such as (Mg, Fe)$_2$SiO$_4$ or Ca$_2$(Fe, Mg)$_5$Si$_8$O$_{22}$(OH)$_2$. It has been found that in certain applications, calcium oxide may be particularly well suited when used in combination with a boric acid crosslinking agent, while calcium hydroxide may particularly well suited when used in combination with borate crosslinking agents. Because of its lower solubility, magnesium oxide may be less effective in certain applications.

The metal oxide or hydroxide pH buffering material may be used in an amount of from 0.1 to 1 kg/m$^3$ of the composition. More particularly, the pH buffering material may be used in an amount of from 0.2 kg/m$^3$ to about 0.5 kg/m$^3$. The amount of pH buffering agent used may depend upon the amount of crosslinking agent. In particular, the buffering agent may be used in an amount of from about 5% to about 30% by weight of the boric acid or borate crosslinking agent, more particularly from about 7.5 to about 20% by weight of the crosslinking agent. The particle size of the solid metal oxide or hydroxide may also vary. When the fluid is being used at higher temperatures the particle size of both the buffering agent and the crosslinking agent may be larger. In many applications, a particle size of 0.035 mm (~400 mesh) or more is suitable for the solid pH buffering agent. In the present invention, the metal oxide or hydroxide buffering agent may have particle sizes of 0.050 mm (~300 mesh) or 0.075 mm (~200 mesh) or more. The metal oxide or hydroxide buffering agent may also be in the form of granulate, in its pure form as a mixture with the crosslinking agent, such as for adding dry on the fly.

In addition to the boric acid/borate crosslinking agent and metal ion pH buffering agent, a delaying or chelating agent may be used with the polymer fluid system. The delaying agents may include those materials which provide a chelating effect on the crosslinking agent, thus limiting to any extent, the crosslinker-polymer chemical interactions which otherwise provide increased viscosity properties. Polymer crosslinking consists of the attachment of two polymeric chains through the chemical association of such chains to a common element or chemical group. The chelating agent may be a ligand that effectively complexes with the crosslinker. Any suitable chelating agent known to those in the art may be used. Examples of suitable chelating agents include, but are not necessarily limited to, polyols, gluconates, sorbitols, mannitols, carbonates, or any mixtures thereof. An example of a suitable chelating agent is sodium gluconate. The chelating agent may be present in the amount of up to about 0.4% by weight of total composition weight, more particularly in the range of from about 0.02% to about 0.3% by weight of total composition weight, and more particularly from about 0.02% to about 0.2% by weight of total composition weight. The chelating agent may be added as a solid, or added as a separate liquid stream or premixed in water to form the treatment composition.

The aqueous medium used to hydrate the polymers may be water or brine. In those embodiments of the invention where the aqueous medium is a brine, the brine may include an inorganic salt or organic salt. Examples of inorganic salts include alkali metal halides, for example, potassium chloride. The carrier brine phase may also comprise an organic salt, such as sodium or potassium formate. Examples of inorganic divalent salts include calcium halides, calcium chloride or calcium bromide. Sodium bromide, potassium bromide, or cesium bromide may also be used. The salt may be chosen for compatibility reasons, for example, where the reservoir drilling composition used a particular brine phase and the completion/clean up composition brine phase is chosen to have the same brine phase.

The crosslinking agent and solid metal ion pH buffering agent, and optionally, the chelating agent, may be used in dry form, each added separately or as a dry blend, to the aqueous fluid at the surface, with or without the hydratable polymer already added. Additionally, these components may be combined and manufactured into granules, such as described in U.S. Patent Publication No. 2006/0205605, which is incorporated by reference in its entirety. Alternatively, the solid crosslinking agent, pH buffering agent, and optionally, the chelating agent, may be suspended in a non-aqueous medium, for example, diesel, mineral oil, etc., prior to mixing with the aqueous fluid and injection into the formation. The suspension may further include a suspension aid, such as hydroxylpropyl cellulose in a glycol ether solvent. Other additives may be added on the fly as liquid or pre-mixed in water.

The compositions of the invention may include an electrolyte, which may be an organic acid, organic acid salt, or inorganic salt. Mixtures of the above members are specifically contemplated as falling within the scope of the invention. This will typically be present in a minor amount (e.g. less than about 15% by weight of the total composition weight). The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred organic acids are formic acid, citric acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, and 3,4-dichlorobenzoic acid.

The inorganic salts that are particularly suitable include, but are not limited to, water-soluble potassium, sodium, and ammonium salts, such as potassium chloride, ammonium chloride, and tetra-methyl ammonium salts. Additionally, magnesium chloride, calcium chloride, calcium bromide, zinc halide, sodium carbonate, and sodium bicarbonate salts may also be used. Any mixtures of the inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability, and in particular clay stability (by inhibiting hydration of the clay for example), is achieved at a concentration level of a few percent by weight and as such the density of fluid is not significantly altered by the presence of the inorganic salt unless fluid density becomes an important consideration, at which point, heavier inorganic salts may be used. In a preferred embodiment of the invention, the electrolyte is potassium chloride. The electrolyte is preferably used in an amount of from about 0.01 wt % to about 15.0 wt % of the total composition weight, and more preferably from about 1.0 wt % to about 8.0 wt % of the total composition weight.

The polymer solutions containing the crosslinking agent and solid metal oxide or hydroxide pH buffering agents are prepared to provide the polymer solution with a pH of a value of any point along the continuum of from about 8 to about 11, and more particularly a pH from about 8.5 to about 9.5, 9.6, 9.7, 9.8, 9.9, 10 or 10.5. At the surface, the initial pH may be from 8.5 to 10. By selection of the solid crosslinking agent and solid buffering agent having limited solubility, the pH may be maintained within these ranges for as long as 30 minutes to 3 hours or more at downhole temperatures that may range from 80° C. to 105° C. or more. This pH range facilitates increased stability under higher temperature conditions, as well as increased shear recovery for the fluid. This is achieved due to the slow dissolution of the crosslinking agent and pH buffering agent, which facilitates in increasing the pH level at higher temperatures. The dissolution rate, as discussed previously, may also be increased or decreased by the selection of particle sizes for these materials, with slower dissolution occurring for larger particles. In conventional crosslinked polymer solutions, the pH of the fluid usually decreases with increased temperature, resulting in a decrease in viscosity. This characteristic is referred to as the fluids thermal stability. As discussed earlier, higher pH levels of from 10 to 12 are commonly used to provide thermal stability to the polymer solution. Such higher pH levels, however, result in longer shear recovery of the fluid.

In particular, the polymer solutions prepared in accordance with the invention may have a viscosity of at least 400 cp at 100 sec$^{-1}$ at temperatures of from greater than 80° C. for at least 30 minutes. Additionally, the polymer solutions may exhibit shear recovery times of less than 5 minutes, or even 1 minute or less, when subjected to increased shear. Such shear recovery may be exhibited in temperatures that are at near wellbore temperatures (typically from about 30° C. to about 60° C.), which may be approximately 50% of the bottomhole static temperature or lower. For example, when subjected to a shear rate of approximately 270 sec$^{-1}$, the fluid may exhibit a shear recovery of 5 minutes or less, or even 1 minute or less, to an increased viscosity of at least 400 cp or greater at 100 sec$^{-1}$.

The polymer solutions are also useful as carrier fluids for proppants. Because of their higher viscosity, the compositions of the invention have particular application for use with large proppant sizes of about 1 mm (~18 mesh), about 1.7 mm (~12 mesh) or greater. The proppants may be those that are substantially insoluble in the polymer solution and/or fluids of the formation. Proppant particles carried by the treatment composition remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc.

The concentration of proppant in the composition may be any concentration that is suitable for carrying out the particular treatment desired. For example, the proppant may be used in an amount up to about 3 kilograms of proppant added per liter of the composition. Also, any of the proppant particles may be coated with a resin to potentially improve the strength, clustering ability, and flow back properties of the proppant.

A fiber component may be included in compositions of the invention to achieve a variety of properties including improving particle suspension, and particle transport capabilities, and foam stability. Fibers used may be hydrophilic or hydrophobic in nature. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like. When used in compositions of the invention, the fiber component may be include at concentrations from about 1 to about 15 grams per liter of the composition, more particularly the concentration of fibers may be from about 2 to about 12 grams per liter of composition, and more particularly from about 2 to about 10 grams per liter of composition.

The compositions may also include a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly creates the borate crosslinks. Lowering the pH can just as easily eliminate the borate/polymer bonds by decreasing the amount of borate anions available in solution, and/or enables complete hydrolysis of the polymer.

Embodiments of the invention may further contain other additives and chemicals that are known to be commonly used in oilfield applications by those skilled in the art. These include, but are not necessarily limited to, materials such as surfactants, breakers, high temperature fluid stabilizers, oxygen scavengers, alcohols, scale inhibitors, corrosion inhibitors, fluid-loss additives, bactericides, clay stabilizers, and the like. Surfactants or surface active agents may be added to the fluid for adjusting the surface tension of the proppant to facilitate clean up of fracturing fluid after treatment. Also, a surfactants may be included to optimize viscosity or to minimize the formation of stable emulsions that contain components of crude oil or a polysaccharide or chemically modified polysaccharide, polymers such as cellulose, derivatized cellulose, guar gum, derivatized guar gum, xanthan gum, or synthetic polymers such as polyacrylamides and polyacrylamide copolymers, oxidizers such as ammonium persulfate and sodium bromate, and biocides such as 2,2-dibromo-3-nitrilopropionamine. In the case of high bottomhole static temperature (>95° C.), additional high temperature stabilizer may be added to prevent oxidation or radical reaction, which may reduce fluid viscosity.

Compositions according to the invention may be foamed and energized well treatment fluids which contain "foamers," which may include surfactants or blends of surfactants that facilitate the dispersion of a gas into the composition to form of small bubbles or droplets, and confer stability to the dispersion by retarding the coalescence or recombination of such bubbles or droplets. Foamed and energized fluids are generally described by their foam quality, i.e. the ratio of gas volume to the foam volume. If the foam quality is between 52% and 95%, the fluid is conventionally called a foam fluid, and below 52%, an energized fluid. Hence, compositions of the invention may include ingredients that form foams or energized fluids, such as, but not necessarily limited to, foaming surfactant, or blends of surfactants, and a gas which effectively forms a foam or energized fluid. Suitable examples of such gases include carbon dioxide, nitrogen, or any mixture thereof.

In most cases, the fluids of the invention are used in hydraulic fracturing treatments. Hydraulic fracturing consists of pumping a proppant-free composition, or pad, into a well faster than the composition can escape into the formation so that the pressure rises and the rock breaks, creating artificial fractures and/or enlarging existing fractures. Then, proppant particles are added to the composition to form a slurry that is pumped into the fracture to prevent it from closing when the pumping is ceased and fracturing pressure declines. The proppant suspension and transport ability of the treatment base composition traditionally depends on the viscosity of the fluid. Techniques for hydraulically fracturing a subterranean formation are known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein.

In the fracturing treatment, compositions of the present invention may be used in the pad treatment, the proppant stage, or both. The components are mixed on the surface. Alternatively, the composition may be prepared on the surface and pumped down tubing while a gas component, such as carbon dioxide or nitrogen, could be pumped down the annular to mix down hole, or vice versa, to form a foam or energized fluid composition.

In another embodiment, the compositions may be used for gravel packing a wellbore. As a gravel packing composition, it may contain gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is used typically having a mesh size between 0.2 mm (70 mesh) and 2.4 mm (8 mesh).

The following examples further serve to illustrate the invention.

EXAMPLES

Shear recovery and thermal stability tests were conducted on various fluids using a Chandler Model 5550 viscometer. Unless otherwise stated the amounts specified in the examples are in $kg/m^3$. As presented in the figures "DT" indicates the delay time before testing measured in minutes and seconds.

Example 1

Figure 1:
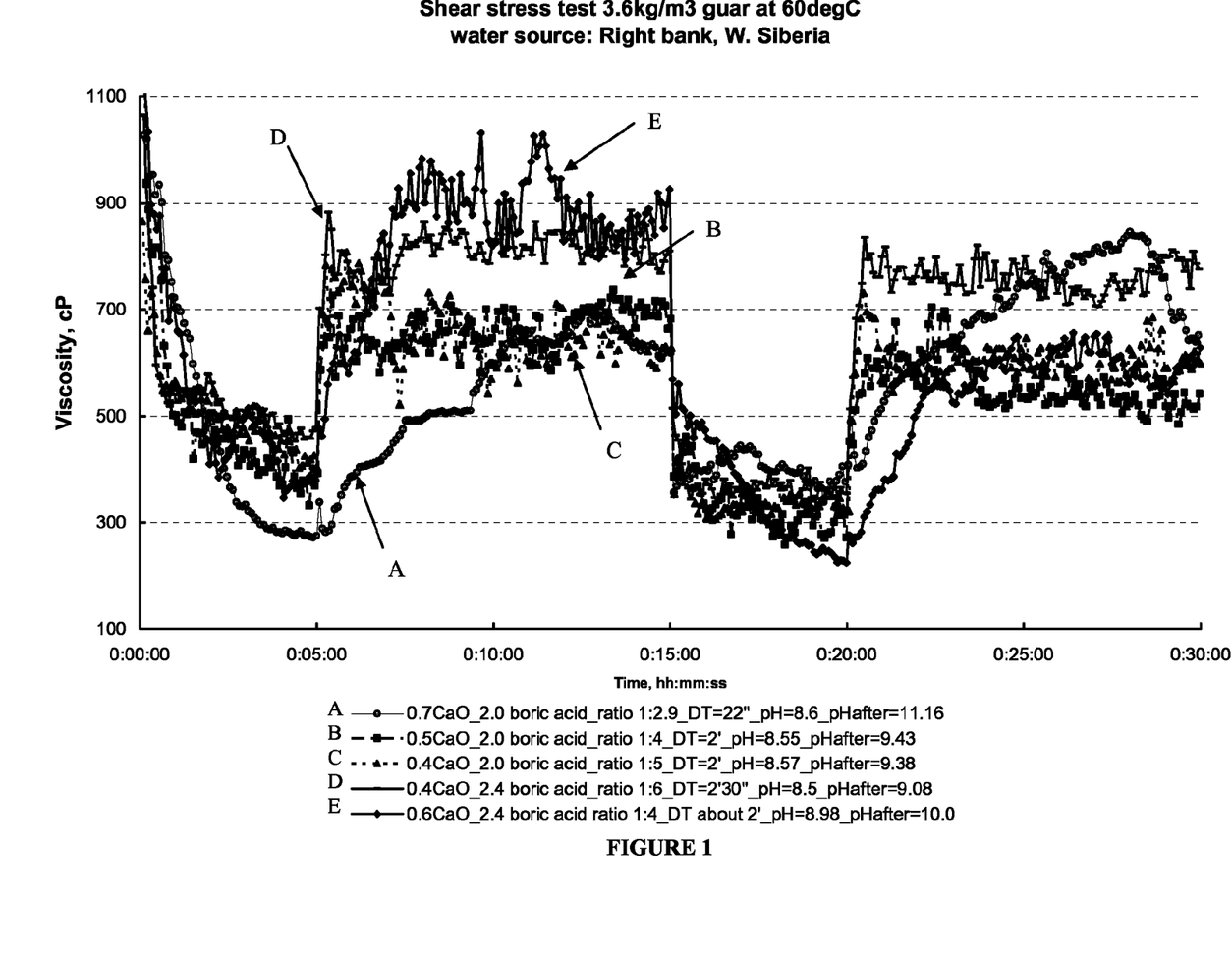
FIG. 1 is a plot showing shear recovery time for various polymer solutions using different amounts of boric acid crosslinking agents and calcium oxide pH buffer at a temperature of 60° C.

Various polymer solutions were prepared with $3.6 \, kg/m^3$ of guar polymer, commercially available as Guar DV 7463 guar polymer from Rhodia, Cranbury, N.J., in distilled water. To this was added various amounts (presented in $kg/m^3$) of solid boric acid crosslinking agent, which included 60% by weight of sodium gluconate. The boric acid had an average particle size of 2 mm. Different amounts (presented in $kg/m^3$) of solid calcium oxide (CaO) particles having an average particle size of 0.1 mm were added to the solution. Additionally, a tetramethylammonium chloride solution in the amount of $2 \, L/m^3$ and a surfactant in the amount of $1 \, L/m^3$ were also added to the polymer solution. The fluid was heated to about 60° C. The tests were run at a shear rate of $270 \, sec^{-1}$, for approximately 5 minutes. The shear rate was then reduced to $100 \, sec^{-1}$ for approximately 10 minutes. The process was repeated with the results being shown in FIG. 1. As can be seen in FIG. 1, all of the samples, except for Sample A containing $0.7 \, kg/m^3$ CaO, showed instant shear recovery.

Example 2

Figure 2:
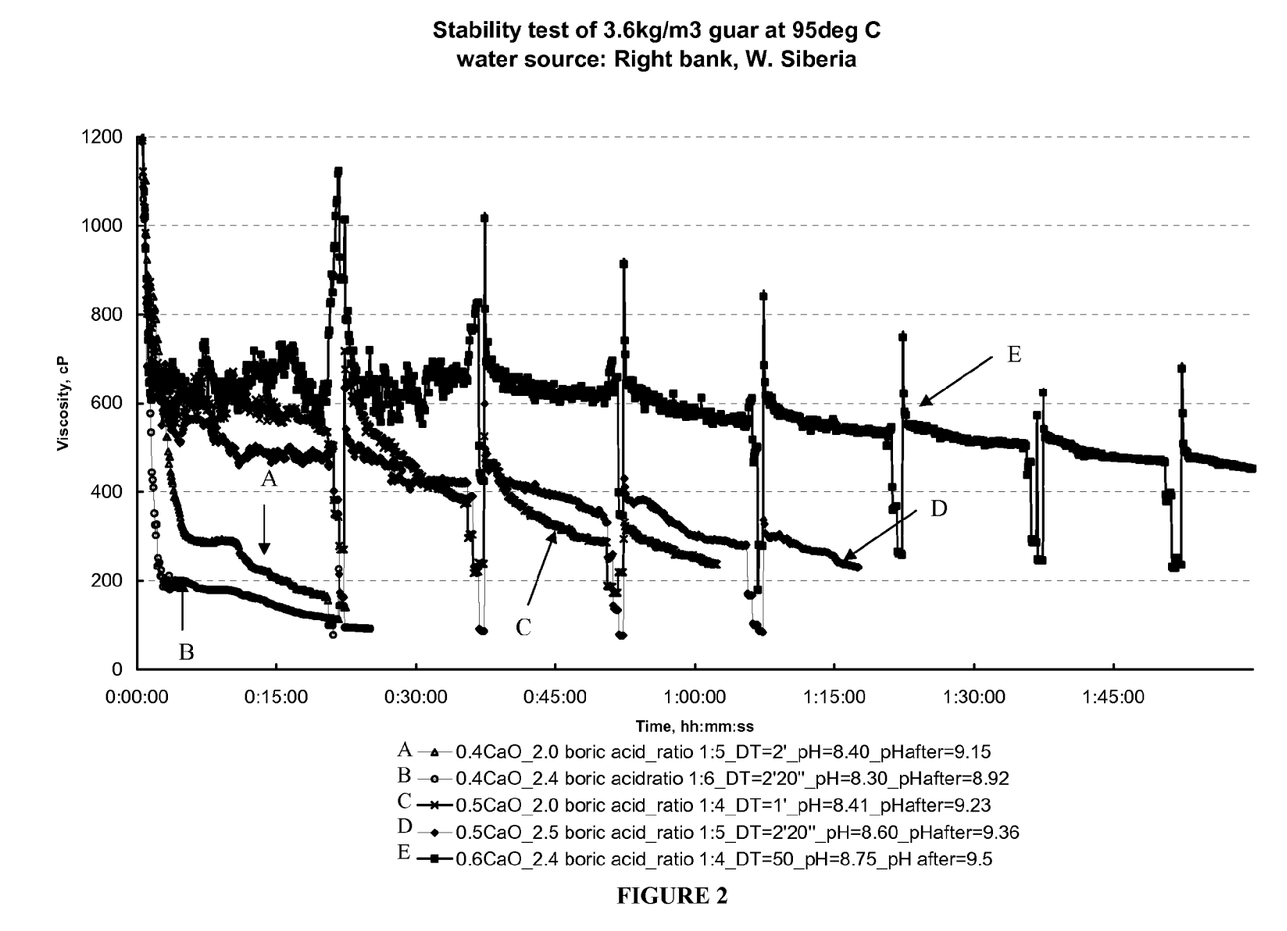
FIG. 2 is a plot showing the viscosity for various polymer solutions using different amounts of boric acid crosslinking agents and calcium oxide pH buffer at a temperature of 95° C.

Various polymer solutions were prepared with $3.6 \, kg/m^3$ of guar polymer, in distilled water. To this was added various amounts of solid boric acid crosslinking agent, which included 60% by weight of sodium gluconate. The boric acid had an average particle size of 2 mm. Different amounts of solid calcium oxide (CaO) particles having an average particle size of 0.1 mm were added to the solution. Additionally, a tetramethylammonium chloride solution in the amount of 2 $L/m^3$ and a surfactant in the amount of $1 \, L/m^3$ were also added to the polymer solution. The fluid was heated to about 95° C. The tests were run at a shear rate of $100 \, sec^{-1}$, for approximately 15 minutes to 2 hours depending upon the stability of the fluid. As can be seen in FIG. 2, samples with the overall higher concentration of CaO and boric acid and at a weight ratio of 1:4 showed the best stability.

Example 3

Figure 3:
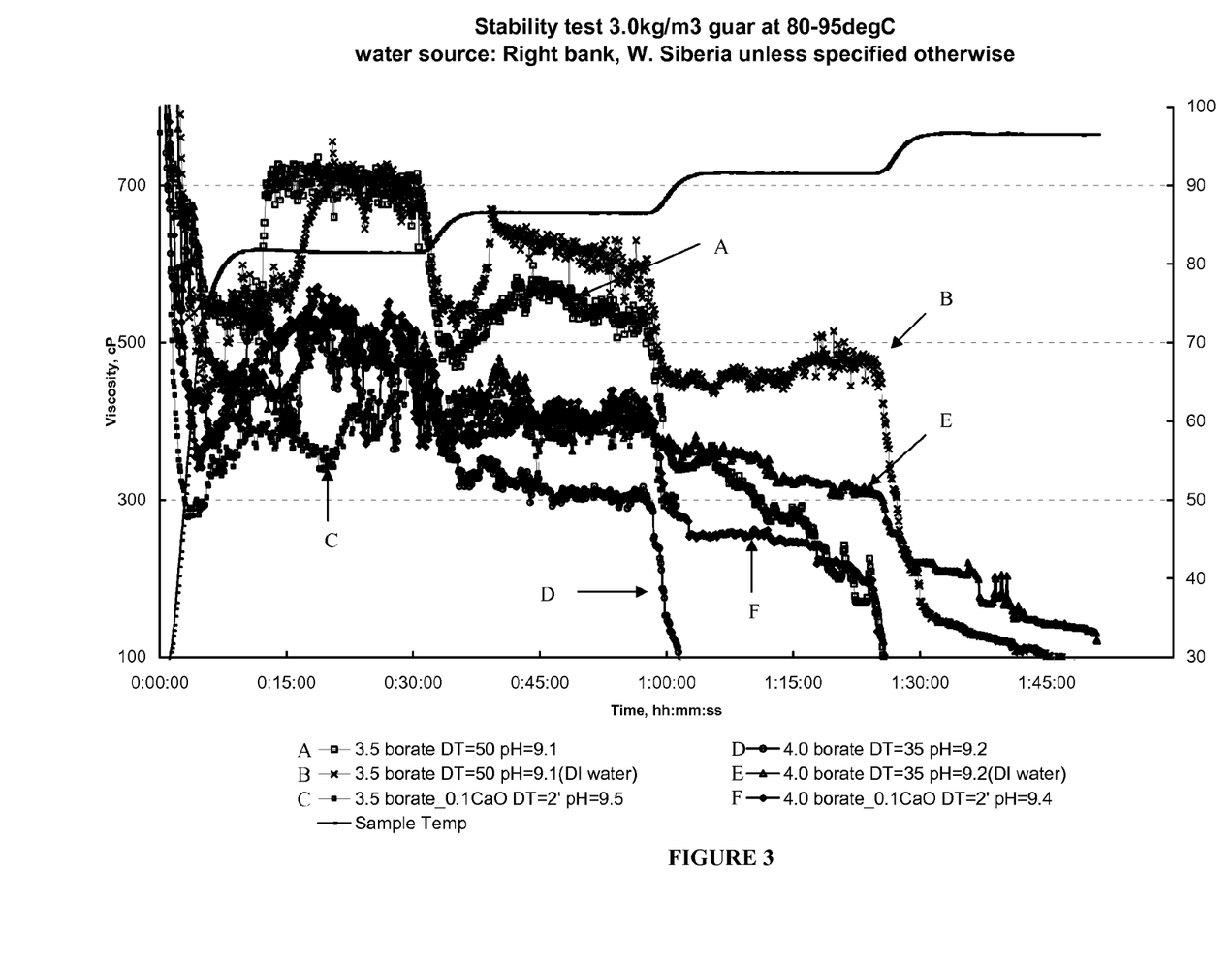
FIG. 3 is a plot showing the viscosity of various polymer solutions using different amounts of borate crosslinking agents with and without a calcium oxide pH buffer at various temperatures ranging from 80° C. to 95° C. over time.

Various polymer solutions were prepared with $3.0 \, kg/m^3$ of a commercially available guar polymer in distilled water. To this was added various amounts of mineral oil slurry of ulexite borate crosslinking agent. The borate had an average particle size of approximately 0.1 mm. Different amounts of solid calcium oxide (CaO) particles having an average particle size of approximately 0.1 mm were added to the solution. Additionally, a tetramethylammonium chloride solution in the amount of $2 \, L/m^3$ and a surfactant in the amount of $1 \, L/m^3$ were also added to the polymer solution. The viscosities were measured at $100 \, sec^{-1}$, while the fluid was heated at different temperatures ranging from approximately 80° C. to 95° C. The results are presented in FIG. 3. Addition of the calcium oxide in combination with the borate crosslinking agent did not appear to improve the performance of the fluid, which may possibly be due to over crosslinking.

Example 4

Figure 4:
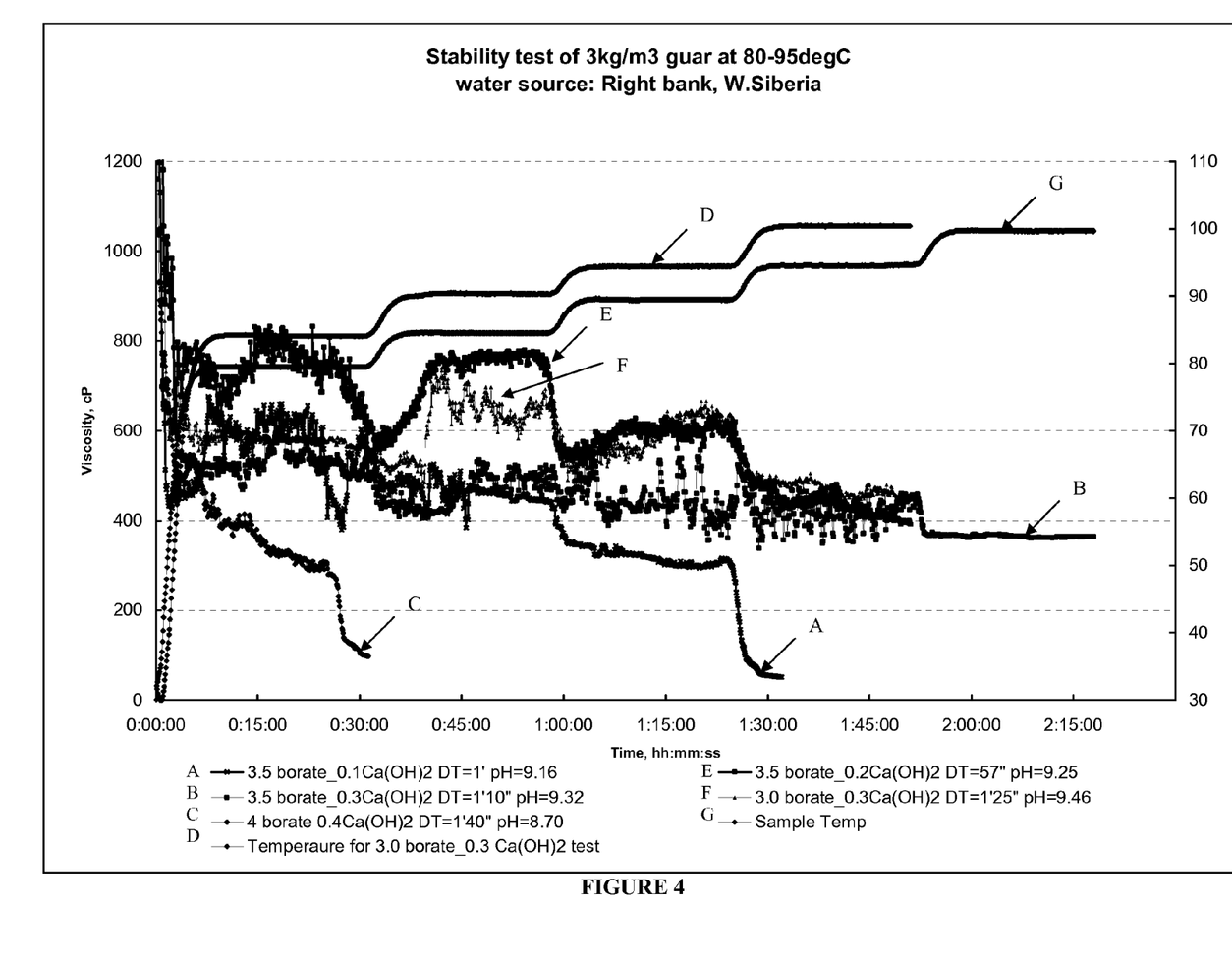
FIG. 4 is a plot showing the viscosity of various polymer solutions using different amounts of borate crosslinking agents and calcium hydroxide pH buffer at various temperatures ranging from 80° C. to 95° C. over time.

Various polymer solutions were prepared with $3.0 \, kg/m^3$ of a commercially available guar polymer in distilled water. To this was added various amounts of mineral oil slurry of ulexite borate crosslinking agent. The borate had an average particle size of approximately 0.1 mm. Different amounts of solid calcium hydroxide ($Ca(OH)_2$) particles having an average particle size of approximately 0.1 mm were added to the solution. Additionally, a tetramethylammonium chloride solution in the amount of $2 \, L/m^3$ and a surfactant in the amount of $1 \, L/m^3$ were also added to the polymer solution. The viscosities of each fluid were measured over time at $100 \, sec^{-1}$ while the fluid was heated at different temperatures ranging from approximately 80° C. to 95° C. The results are shown in FIG. 4. As can be seen in FIG. 4, adding the calcium hydroxide with the borate crosslinking agent resulted in good thermal stability of the samples, with viscosities of 400 cP or higher being achieved in most cases, even at the higher temperatures.

Example 5

Figure 5:
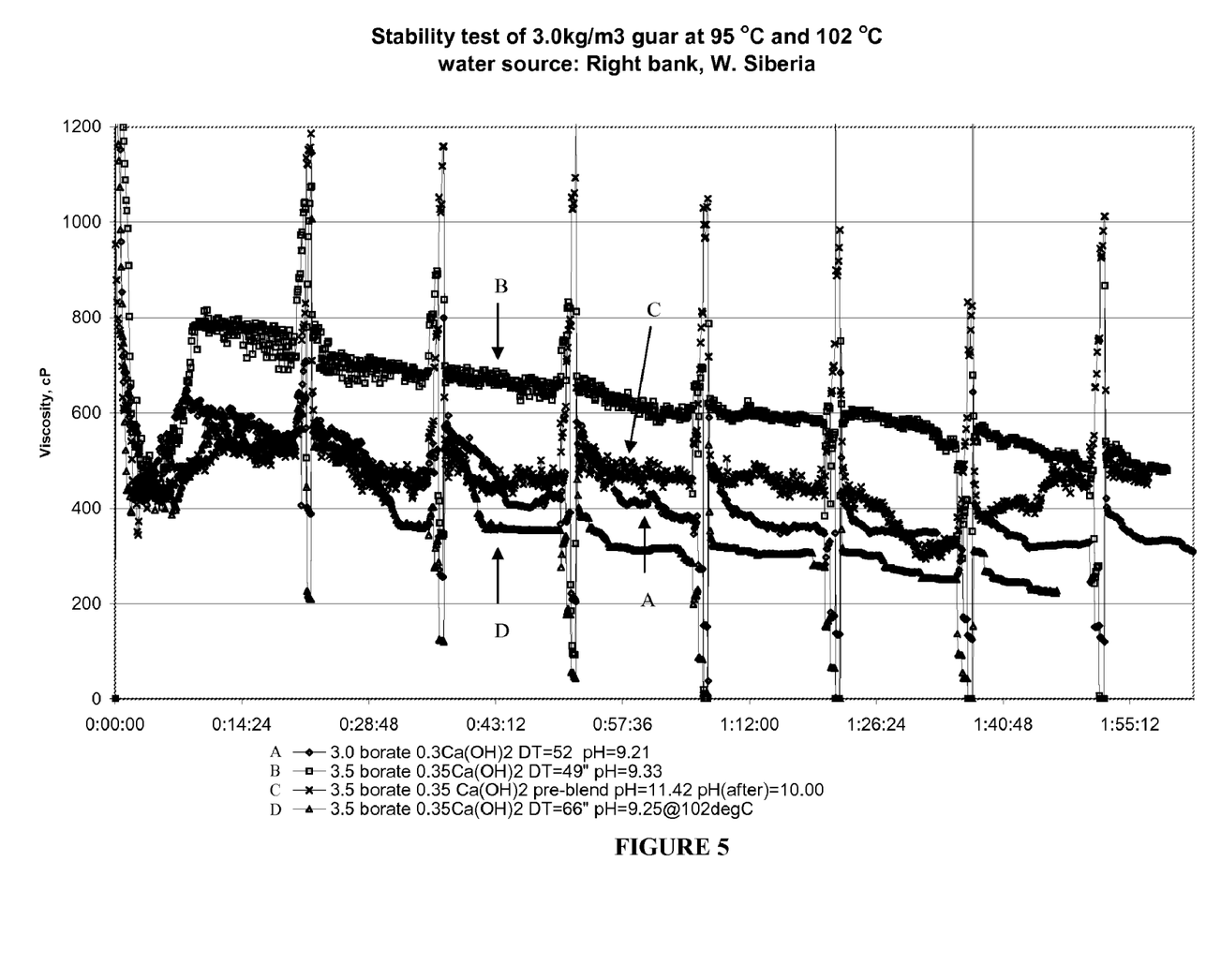
FIG. 5 is a plot showing viscosity of various polymer solutions using different amounts of borate crosslinking agents and calcium hydroxide pH buffer at a temperature of 95° C. and 102° C.
Figure 6:
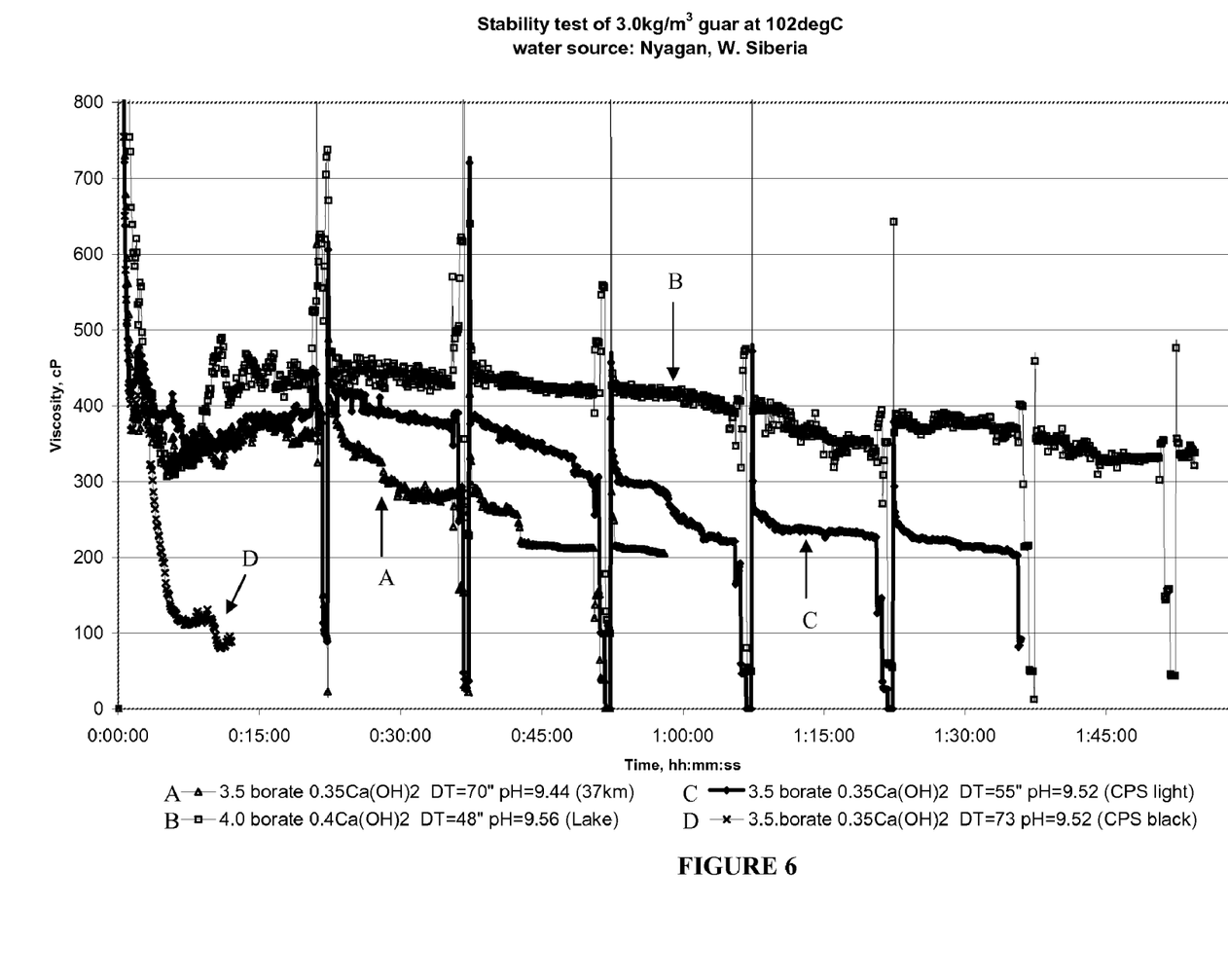
FIG. 6 is a plot showing the viscosity of a polymer solution utilizing different amounts borate crosslinking agent and calcium hydroxide pH buffer at 95° C. and 102° C. over time.

Various polymer solutions were prepared with $3.0 \, kg/m^3$ of a commercially available guar polymer in water from W. Siberia. To this was added various amounts of mineral oil slurry of a borate crosslinking agent, presented as $L/m^3$ (for this slurry, $L/m^3$ can be converted to $Kg/m^3$ by multiplying the value by 1.14, which represents the density of the slurry). The borate had an average particle size of about 0.1 mm. Different amounts of solid calcium oxide ($Ca(OH)_2$) particles having an average particle size of 0.1 mm were added to the solution to maintain a weight ratio of borate to calcium hydroxide of about 10:1. Additionally, a tetramethylammonium chloride solution in the amount of $2 \, L/m^3$ and a surfactant in the amount of $1 \, L/m^3$ were also added to the polymer solution. The fluid was heated in one sample to 102° C. and to 95° C. in the remaining samples. The tests were run at a shear rate of $100 \, sec^{-1}$, for approximately 2 hours. The results are shown in FIG. 5.

Example 6

Various polymer solutions were prepared with $3.0 \, kg/m^3$ of a commercially available guar polymer in various water samples from W. Siberia. To this was added either $3.5 \, L/m^3$ and $4.0 \, L/m^3$ of a borate crosslinking agent in a mineral oil slurry. The borate had an average particle size of about 0.1 mm. A mixture of tetramethylammonium chloride solution and a surfactant in the amount of $3 \, L/m^3$ were also added to the polymer solution. Solid calcium oxide ($Ca(OH)_2$) particles in an amount of $0.35 \, kg/m^3$ and $0.4 \, kg/m^3$ and having an average particle size of 0.1 mm were added to the solution. The tests were run at a shear rate of $100 \, sec^1$, while the fluid was gradually heated to about 102° C. Sample D may not have worked well do to contamination.

Example 7

Figure 7:
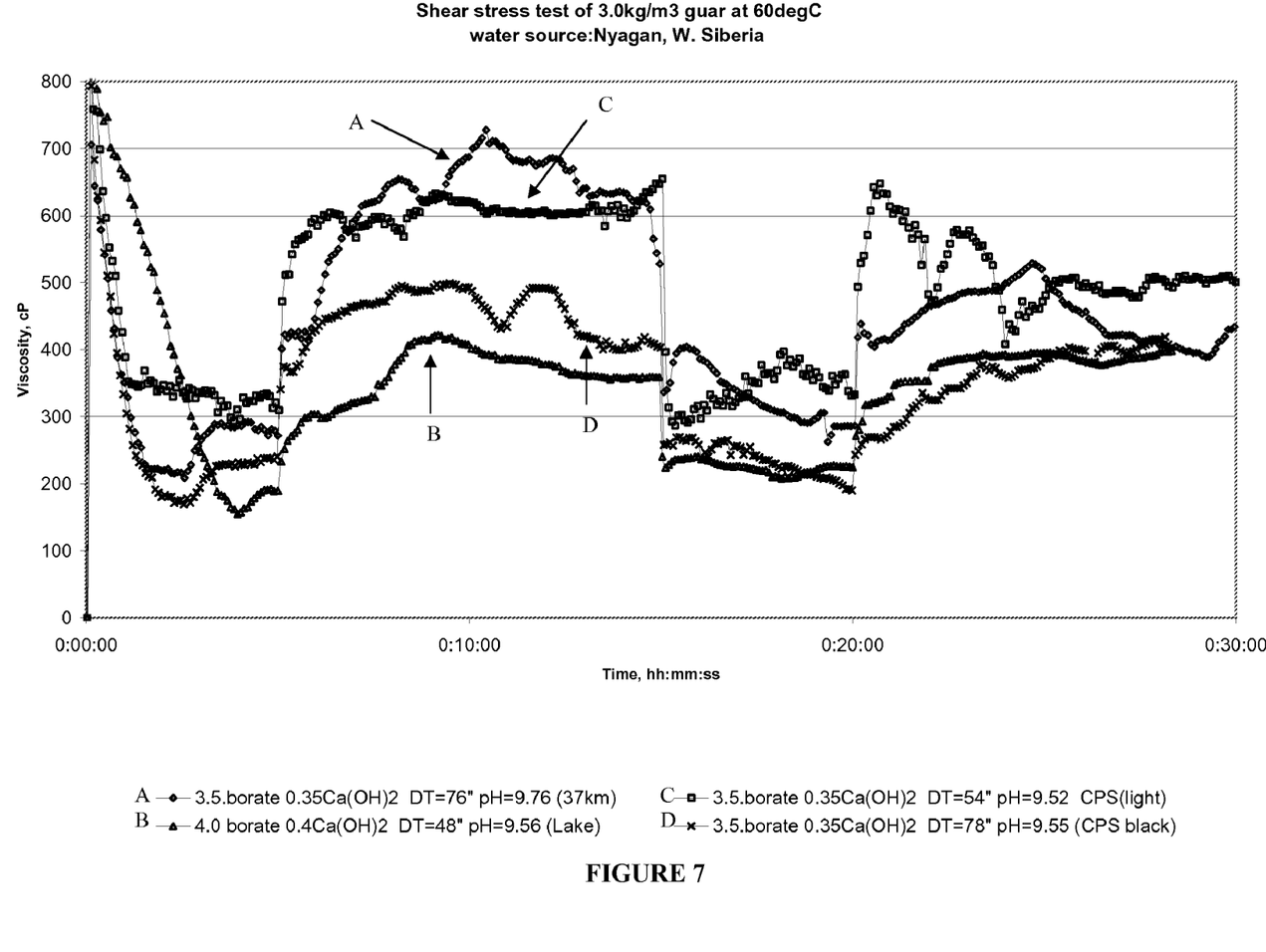
FIG. 7 is a plot showing the shear recovery time for various polymer solutions utilizing different amounts of boric acid crosslinking agent and 0.35 kg/m³ of a calcium hydroxide pH buffer at a temperature of 60° C.

Various polymer solutions were prepared with $3.0 \, kg/m^3$ of a commercially available guar polymer in distilled water. To this was added $3.5 \, L/m^3$ and $4.0 \, L/m^3$ of a borate crosslinking agent in a mineral oil slurry. The borate had an average particle size of about 0.1 mm. Solid calcium oxide ($Ca(OH)_2$)

particles in an amount of 0.35 kg/m³ and 0.4 kg/m³ having an average particle size of 0.1 mm were added to the solution. A mixture of tetramethylammonium chloride solution and a surfactant in the amount of 3 L/m³ were also added to the polymer solution. The fluid was heated to about 60° C. The tests were run at a shear rate of 270 sec⁻¹, for approximately 5 minutes. The shear rate was then reduced to 100 sec−1 for approximately 10 minutes. The process was repeated, with the results being shown in FIG. 7. Except for the Sample B prepared with lake water, all fluids shown exhibited substantially instant shear recovery.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a subterranean formation penetrated by a wellbore, the method comprising:
    suspending a solid boric acid or borate crosslinking agent and a solid metal oxide or metal hydroxide in a non-aqueous fluid prior to combining with a crosslinkable hydrated aqueous polymer solution;
    providing the polymer solution;
    combining the crosslinking agent and the solid metal oxide or metal hydroxide that has solubility of less than about 100 kg/m³ at 20° C. within the polymer solution, wherein the metal oxide or metal hydroxide provides the solution with a pH of from about 8 to about 11 as the metal oxide or metal hydroxide solublizes in the solution; and
    introducing the solution into the wellbore.

2. The method of claim 1, wherein: the solid metal oxide or metal hydroxide is selected from at least one of calcium oxide (CaO), calcium hydroxide (Ca(OH)₂), silicate oxides and silicate hydroxides.

3. The method of claim 1, further comprising: combining a cross-linking delaying agent with the solution.

4. The method of claim 3, wherein: the delaying agent is selected from a polyol, a gluconate, a sorbitol, a manitol, a carbonate or mixtures thereof.

5. The method of claim 1, wherein: the solid metal oxide or metal hydroxide is used in combination with the crosslinking agent in an amount of from about 5% to about 30% by weight of the crosslinking agent.

6. The method of claim 1, wherein: a pH of from about 8.5 to about 10.5 is provided after combining the crosslinking agent and the solid metal oxide or metal hydroxide.

7. The method of claim 1, wherein: the hydrated polymer is selected from guar, hydroxypropyl guar, carboxymethyl guar, carboxymethylhydroxypropyl guar, synthetic polymer and guar-containing compounds.

8. The method of claim 1, wherein: the borate is an alkaline earth metal borate or an alkali metal borate.

9. The method of claim 1, wherein: the solid crosslinking agent has a particle size of about 0.2 mm or less.

10. The method of claim 1, wherein: the solid metal oxide or metal hydroxide has a particle size of about 0.075 mm or more.

11. The method of claim 1, wherein: at least one of the solid borate crosslinking agent and the solid metal oxide or metal hydroxide has a particle size of about 0.038 mm or less.

12. The method of claim 1, wherein: the polymer solution containing the crosslinking agent and the solid metal oxide or metal hydroxide exhibits a viscosity of 400 cp at 100 sec⁻¹ at temperatures of from greater than 80° C. for at least 30 minutes.

13. The method of claim 1, wherein: the polymer solution containing the crosslinking agent and the solid metal oxide or metal hydroxide exhibits a shear recovery time of less than 5 minutes when subjected to increased shear at from about 30 to 60° C. to a minimum viscosity of about 400 cP when the shear rate is decreased from 270 sec⁻¹ to 100 sec⁻¹.

14. The method of claim 1, wherein: the solution is introduced into the wellbore at a pressure sufficient to fracture the subterranean formation.

15. The method of claim 1, wherein: the solution further contains a propping agent.

16. The method of claim 1, wherein: the crosslinking agent and the solid metal oxide or metal hydroxide are combined and formed into granules and suspended in the non-aqueous medium prior to mixing with the aqueous fluid.

17. A method of treating a subterranean formation penetrated by a wellbore, the method comprising:
    suspending a solid boric acid or borate crosslinking agent and a solid metal oxide or metal hydroxide in a non-aqueous fluid prior to combining with a crosslinkable hydrated aqueous polymer solution;
    providing the polymer solution;
    combining the solid boric acid or borate crosslinking agent and at least one of a calcium oxide (CaO), calcium hydroxide (Ca(OH)₂), silicate oxide and silicate hydroxide pH buffering agent; and
    introducing the solution into the wellbore.

18. A method of at least one of shortening the shear recovery time and increasing the thermal stability of an aqueous polymer solution comprising:
    suspending a solid boric acid or borate crosslinking agent and a solid metal oxide or metal hydroxide in a non-aqueous fluid prior to combining with a crosslinkable hydrated aqueous polymer solution;
    providing the polymer solution;
    combining the solid borate crosslinking agent and a solid metal oxide pH buffering agent that has a solubility of less than about 100 kg/m³ at 20° C. within the polymer solution, to provide a pH of from about 8 to about 11.

* * * * *